US011625135B2

United States Patent
Kwon et al.

(10) Patent No.: US 11,625,135 B2
(45) Date of Patent: Apr. 11, 2023

(54) TOUCH SENSOR INCLUDING SEGMENT PATTERN DIVIDING SENSING ELECTRODE

(71) Applicant: DONGWOO FINE-CHEM CO., LTD., Iksan-si (KR)

(72) Inventors: Dohyoung Kwon, Osan-si (KR); Cheol Hun Lee, Pyeongtaek-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 0 days.

(21) Appl. No.: 17/672,219

(22) Filed: Feb. 15, 2022

(65) Prior Publication Data

US 2022/0261118 A1 Aug. 18, 2022

(30) Foreign Application Priority Data

Feb. 18, 2021 (KR) .................. 10-2021-0021752

(51) Int. Cl.
*G06F 3/044* (2006.01)
*G06F 3/041* (2006.01)

(52) U.S. Cl.
CPC .......... *G06F 3/0448* (2019.05); *G06F 3/0446* (2019.05); *G06F 3/0412* (2013.01); *G06F 2203/04111* (2013.01)

(58) Field of Classification Search
CPC .... G06F 3/0443; G06F 3/0446; G06F 3/0448; G06F 3/04112; G06F 3/0445; G06F 3/041; G06F 3/0412; G06F 3/044; G06F 2203/04111; G06F 2203/04112
See application file for complete search history.

(56) References Cited

U.S. PATENT DOCUMENTS

| 10,037,109 B2* | 7/2018 | Yashiro | G06F 3/0445 |
| 2011/0210935 A1* | 9/2011 | Chuang | G06F 3/0445 345/174 |
| 2011/0290631 A1* | 12/2011 | Kuriki | G06F 3/0446 200/600 |
| 2014/0332262 A1* | 11/2014 | Yoshiki | G06F 3/0445 174/264 |
| 2016/0103517 A1* | 4/2016 | Kang | G06F 3/0412 345/174 |
| 2019/0050104 A1* | 2/2019 | Na | G06F 3/044 |
| 2020/0042141 A1* | 2/2020 | Kwon | G06F 3/0448 |
| 2020/0089372 A1* | 3/2020 | Park | G06F 3/0448 |
| 2020/0303467 A1* | 9/2020 | Feng | H01L 27/323 |
| 2022/0197418 A1* | 6/2022 | Liu | G06F 3/0412 |
| 2022/0334678 A1* | 10/2022 | Long | G06F 3/0443 |

FOREIGN PATENT DOCUMENTS

| KR | 10-1952770 B1 | 2/2009 |
| KR | 10-2014-0051649 A | 5/2014 |

* cited by examiner

*Primary Examiner* — Darlene M Ritchie
(74) *Attorney, Agent, or Firm* — Sughrue Mion, PLLC

(57) ABSTRACT

A touch sensor includes a first sensing electrode unit formed on a substrate in a first direction and a second sensing electrode unit formed on the substrate in a second direction crossing the first direction. A plurality of micro-etched patterns are formed on a boundary of unit transparent electrodes constituting the first sensing electrode unit and the second sensing electrode unit. The unit transparent electrode has a shape in which a portion of a curve connecting vertices of a polygon is removed, and adjacent unit transparent electrodes are electrically connected to each other. It includes a segmental pattern dividing the first or second sensing electrode unit into two or more areas.

19 Claims, 6 Drawing Sheets

[Figure 1A]
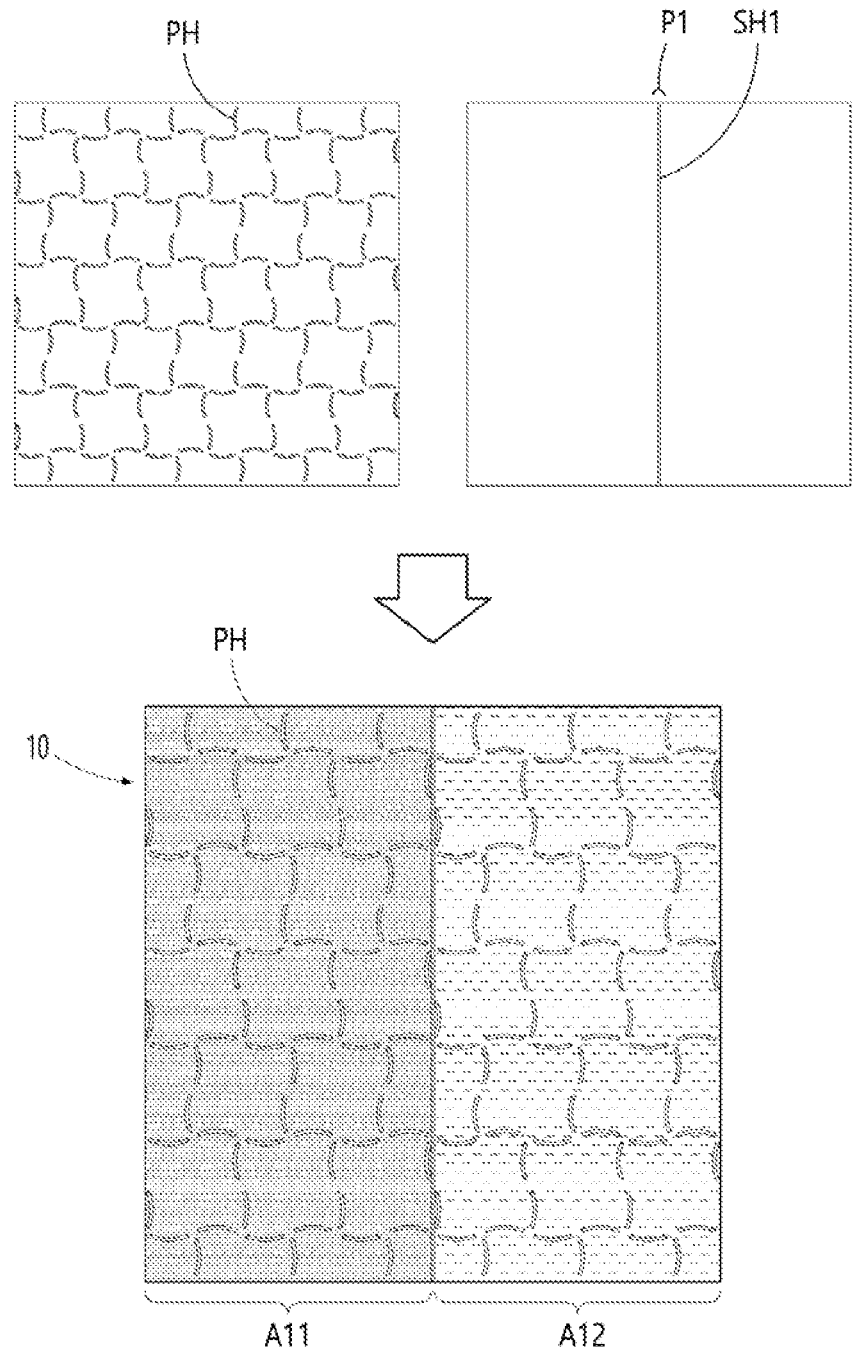

【Figure 1B】
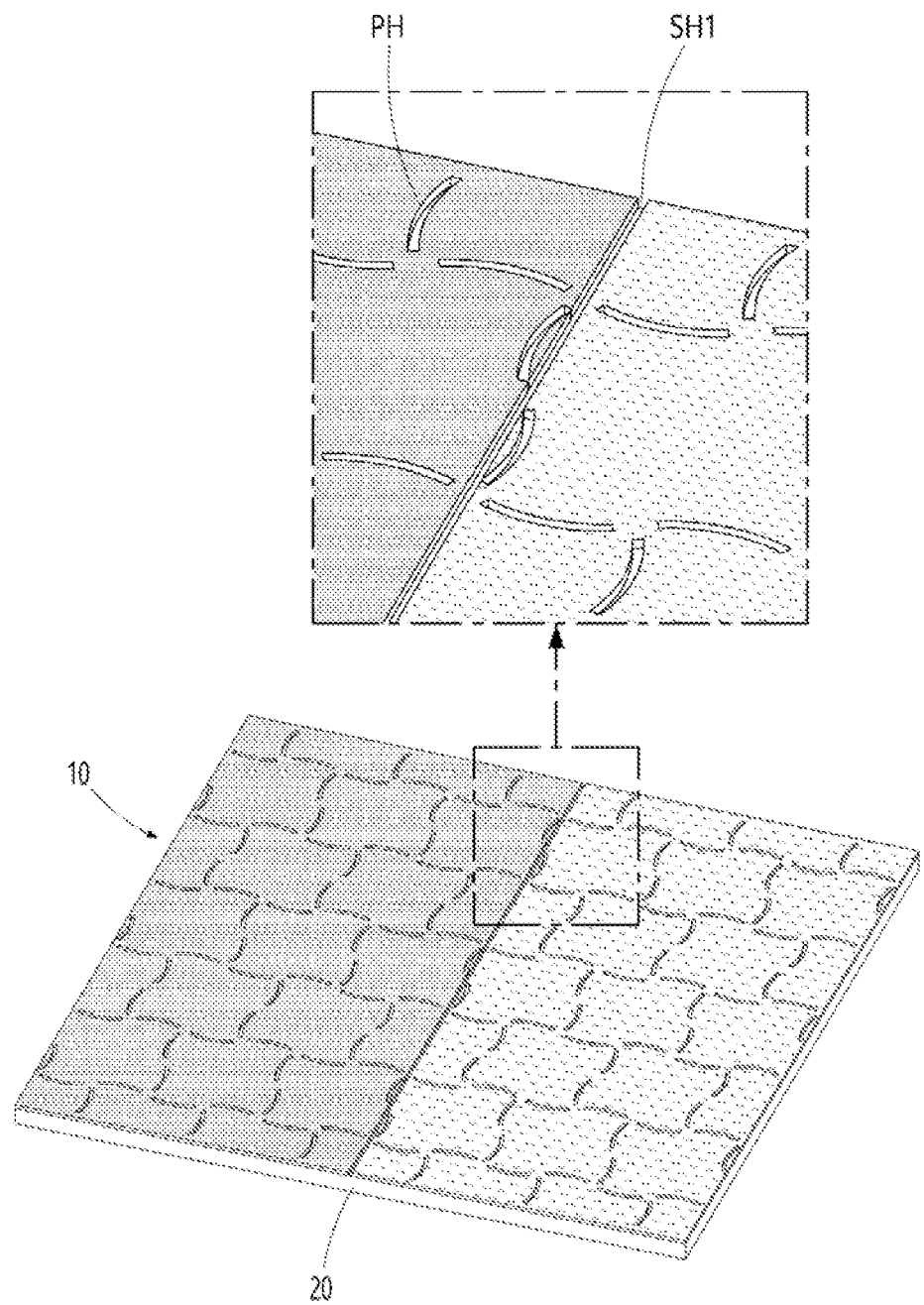

[Figure 2A]
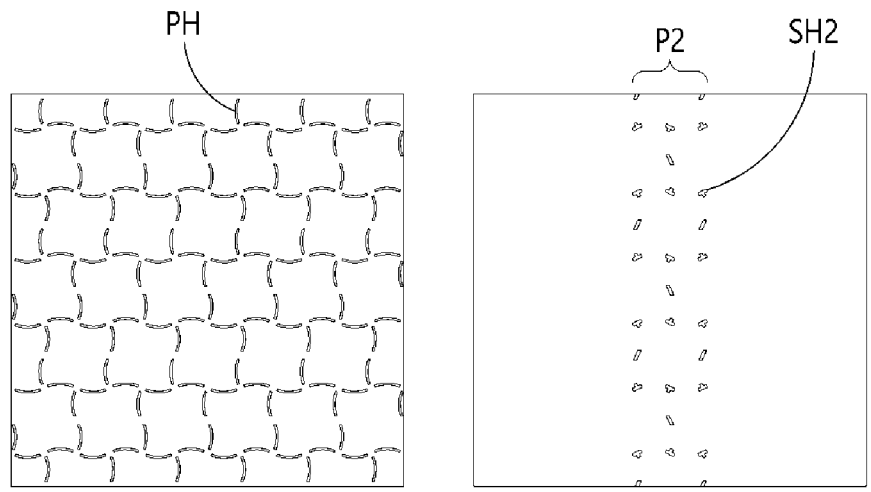
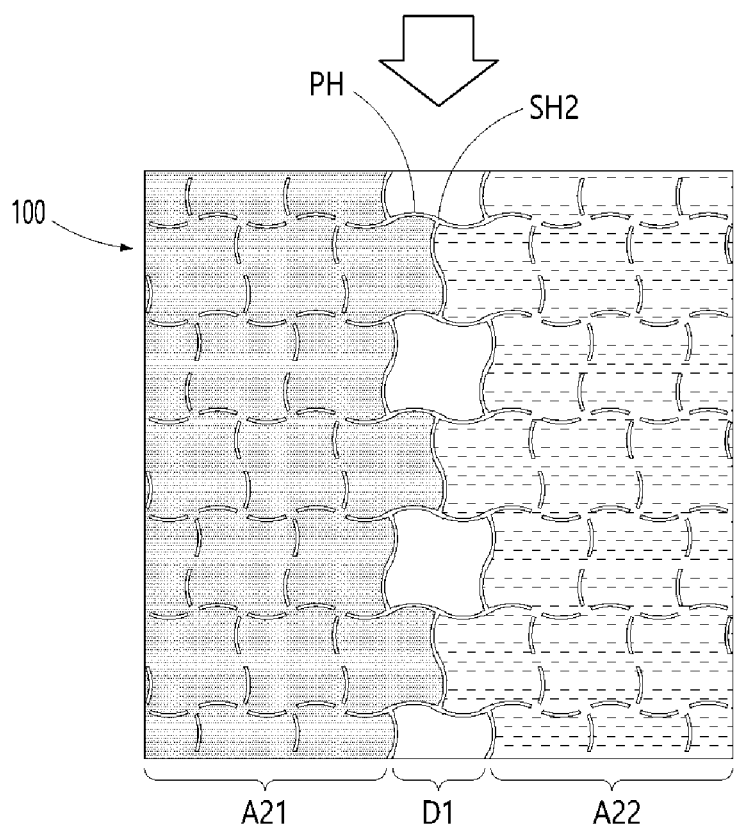

【Figure 2B】
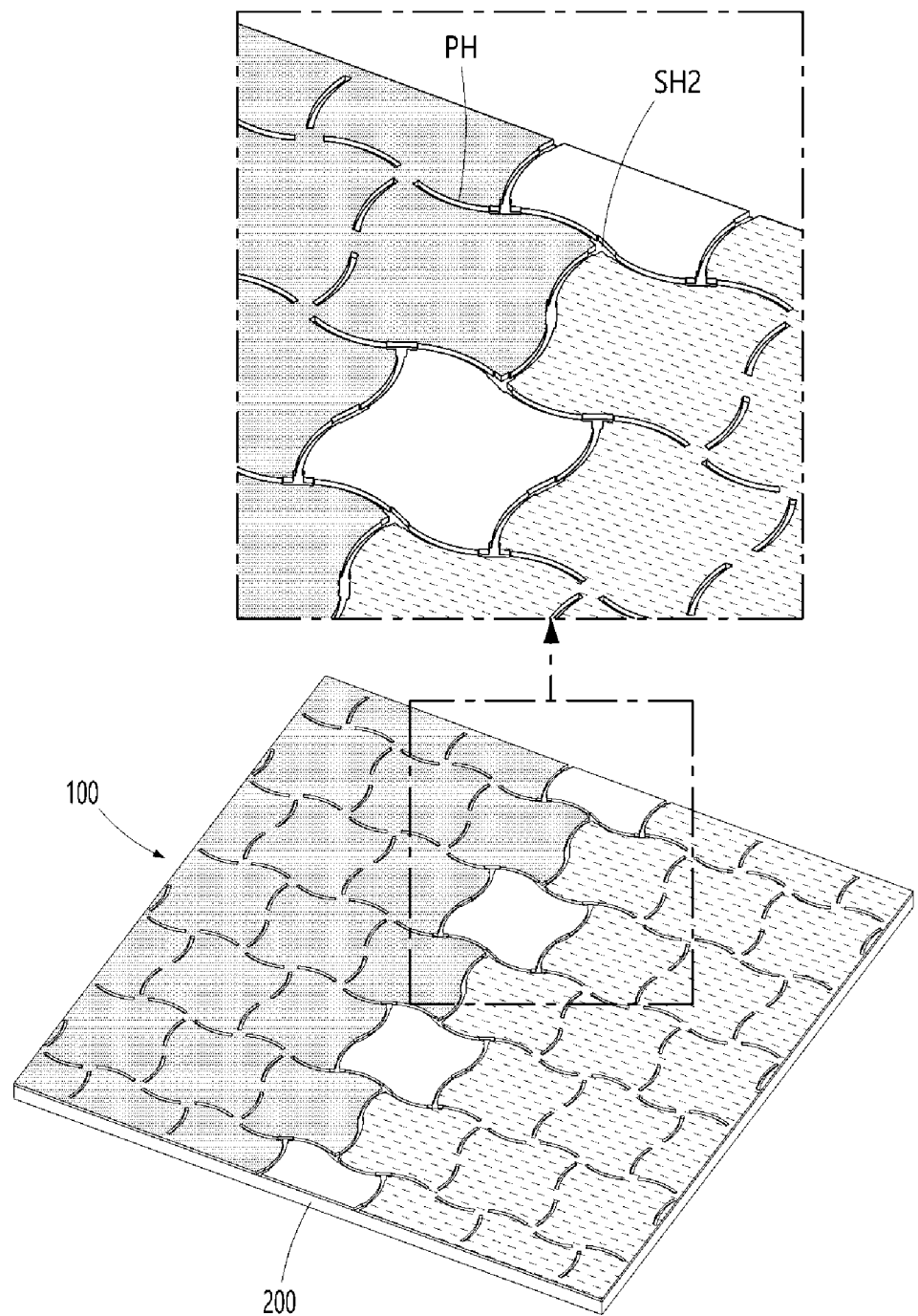

【Figure 3A】
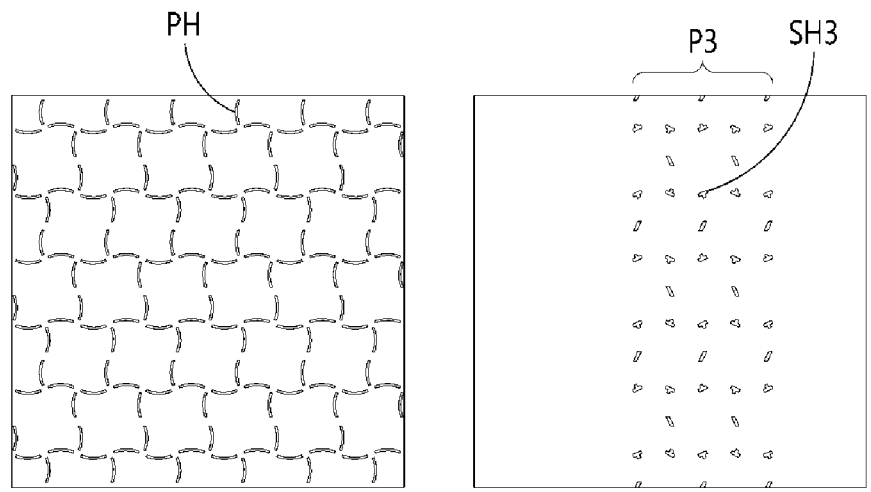
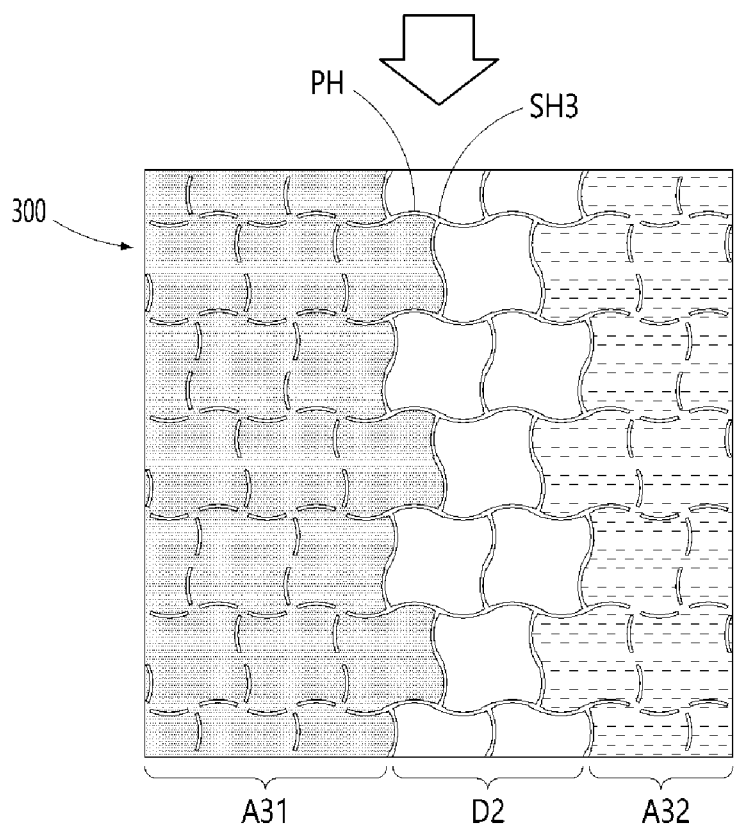

【Figure 3B】
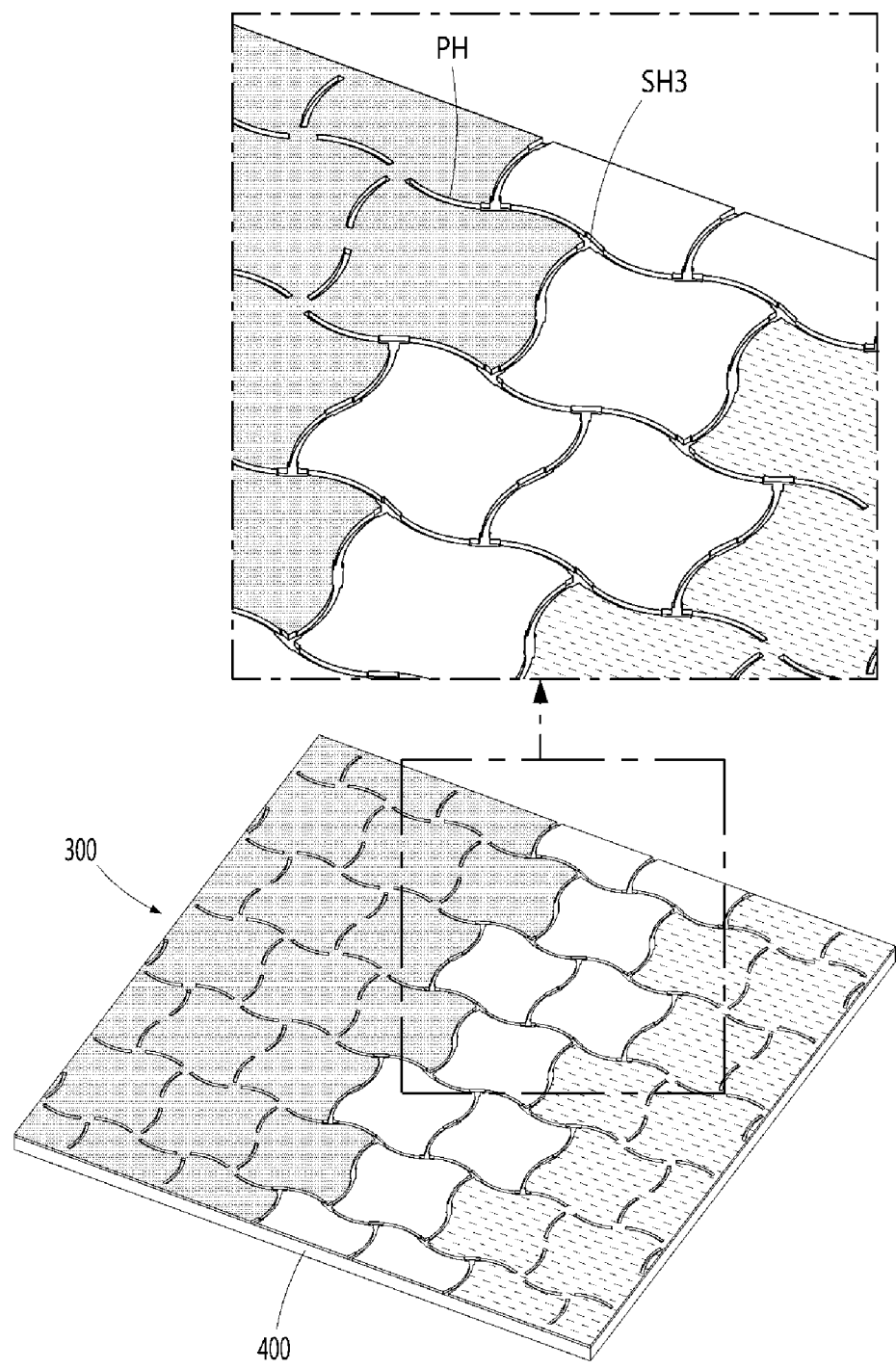

TOUCH SENSOR INCLUDING SEGMENT PATTERN DIVIDING SENSING ELECTRODE

CROSS REFERENCE TO RELATED APPLICATIONS

This application claims priority based on Korean Patent Application No. 10-2021-0021752, filed Feb. 18, 2021, the entire content of which is incorporated herein by reference in its entirety.

TECHNICAL FIELD

The present invention relates to a touch sensor. Particularly, the present invention relates to a touch sensor capable of blocking or minimizing visibility of a segmental pattern formed on a sensing electrode for divided driving.

BACKGROUND ART

A touch sensor includes a sensing electrode for sensing a user's touch operation. The sensing electrode may include a plurality of sensing electrode units (sensing cells) arranged to cross each other. The sensing electrode may be divided into a sensing region in which the sensing electrode unit exists and an inter-cell region in which the sensing electrode unit does not exist.

The sensing region and the inter-cell region may have different optical properties such as transmittance and reflectance. As a result, the sensing region and the inter-cell region are distinguished, which causes a problem of being unnecessarily recognized by a user.

In order to solve this problem, Korean Patent Registration No. 10-1952770 (Touch Sensor) minimizes the difference in optical properties between the sensing region and the inter-cell region by forming a fine pattern on the sensing electrode unit. Through this, Korean Patent Registration No. 10-1952770 blocks or minimizes unnecessary recognition of the sensing region by the user.

Meanwhile, a large-area touch sensor takes a method of driving the touch sensor dividedly. The sensing electrode unit is divided into a first area and a second area that are driven dividedly. At the boundary of the divided first and second areas, a segmental pattern is formed to penetrate up and down to the sensing electrode units and separate the sensing electrode units physically and electrically.

FIGS. 1A and 1B are a plan view and a perspective view illustrating a conventional touch sensor in which a segmental pattern is configured in a line shape.

As shown in FIGS. 1A and 1B, the conventional touch sensor driven dividedly configures a segmental pattern P1, which divides a sensing electrode unit 10 into a first area A11 and a second area A12, as an integrated segmental etched part SH1 in the form of a line. However, the segmental pattern P1 in the form of a line is visually distinguished from the sensing electrode unit 10 having a specific pattern, for example, the sensing electrode unit in which a micro-etched pattern forming a boundary with the pattern etched part PH is arranged in a tessellation structure. Accordingly, a problem in which the segmental pattern P1 in the form of a line is recognized by the user may occur.

DISCLOSURE OF INVENTION

Technical Problem

An object of the present invention is to block or minimize the easy recognition of a segmental pattern formed for divided driving in a large-area touch sensor.

Another object of the present invention is to make it easy to apply a split stitch exposure method used when manufacturing a large-area touch sensor.

Technical Solution

A touch sensor of the present invention for achieving this purpose includes a first sensing electrode unit formed on a substrate in a first direction and a second sensing electrode unit formed on the substrate in a second direction crossing the first direction. A plurality of micro-etched patterns are formed on a boundary of unit transparent electrodes constituting the first sensing electrode unit and the second sensing electrode unit. The unit transparent electrode has a shape in which a portion of a curve connecting vertices of a polygon is removed. Adjacent unit transparent electrodes are electrically connected to each other. The touch sensor of the present invention includes a segmental pattern dividing the first or second sensing electrode unit into two or more areas.

In the touch sensor of the present invention, the segmental pattern may be etched in an island shape along the boundary of the unit transparent electrode.

In the touch sensor of the present invention, the segmental pattern may be formed to have a width equal to or greater than the width of the micro-etched pattern.

In the touch sensor of the present invention, the segmental pattern may separate the first or second sensing electrode unit vertically.

In the touch sensor of the present invention, the segmental pattern may separate the first or second sensing electrode unit left and right.

In the touch sensor of the present invention, the segmental pattern may be formed in the same process as the micro-etched pattern.

In the touch sensor of the present invention, the segmental pattern may be formed of one or more lines.

In the touch sensor of the present invention, the segmental pattern may have the same spatial frequency as the micro-etched pattern.

The touch sensor of the present invention may include a bridge electrode unit connecting two second sensing electrode units adjacent to each other with the first sensing electrode unit interposed therebetween. An inter-electrode dummy is formed between the first sensing electrode unit and the second sensing electrode unit. The inter-electrode dummy has the same shape as the unit transparent electrode. The inter-electrode dummy is insulated from the unit transparent electrode. A plurality of the unit transparent electrodes divided by the micro-etched pattern may have a tessellation structure.

The touch sensor of the present invention may include an insulation layer formed on the substrate on which the first sensing electrode unit is formed. The second sensing electrode unit may be formed on the insulation layer.

In the touch sensor of the present invention, the curve may be one or more selected from a group consisting of: a sine curve, a cosine curve, a conic section, a catenary, a curve of pursuit, a cycloid, a trochoid, a cardioid.

In the touch sensor of the present invention, the curve may be a curve continuously connecting the vertices of the polygon, or a curve partially formed by discontinuously connecting the vertices of the polygon.

In the touch sensor of the present invention, the boundary of the unit transparent electrodes may have a shape in which a portion of the curve connecting two adjacent vertices among the six vertices of the hexagon has been removed.

In the touch sensor of the present invention, the boundary of the unit transparent electrodes may have a shape in which a portion of the curve connecting two adjacent vertices among the four vertices of a rectangle arranged in a grid structure has been removed.

In the touch sensor of the present invention, the boundary of the unit transparent electrodes may have a shape in which a portion of the curve connecting two adjacent vertices among the four vertices of a rectangle arranged in a zigzag structure has been removed.

In the touch sensor of the present invention, the boundary of the unit transparent electrodes may have a shape in which a portion of the curve connecting two adjacent vertices among the four vertices of a rhombus has been removed.

In the touch sensor of the present invention, a pitch of the unit transparent electrode may be 100 μm to 500 μm In the touch sensor of the present invention, a width of the micro-etched pattern may be 5 μm to 20 μm.

In the touch sensor of the present invention, a width of a connection part connecting the adjacent unit transparent electrodes may be 20 μm to 60 μm.

In the touch sensor of the present invention, the same high-frequency components may be disposed on an entire surface of the touch sensor by inserting a plurality of dummy patterns having the same spatial frequency as the micro-etched pattern between the first sensing electrode unit and the second sensing electrode unit. Through this, a touch sensor pattern may not be recognized due to the same high-frequency component disposed on the entire surface of the touch sensor.

Advantageous Effects

In the present invention, when a segmental pattern is formed on a sensing electrode unit to divide a touch sensor into a plurality of areas and drive in a large-area touch sensor, the recognition of the segmental pattern can be blocked or minimized by arranging it in the same shape as a micro-etched pattern forming the boundary of the unit transparent electrode.

In the present invention, it is easy to apply the divided stitch exposure method used when forming a large-area touch sensor by forming the micro-etched pattern of the sensing electrode unit and the segmental pattern for divided driving with the same pattern and the same spatial frequency.

In addition, in the present invention, when a touch sensor is bonded to a display panel, the problem of lowering the optical quality of an imaging device in which an optical interference pattern due to the interference between the pixel array of the display panel and the pixel array of the touch sensor is expressed in the form of moire can be solved.

DESCRIPTION OF DRAWINGS

FIGS. 1A and 1B are a plan view and a perspective view of a conventional touch sensor in which a segmental pattern is formed in a line shape.

FIGS. 2A and 2B are a plan view and a perspective view of a touch sensor according to the present invention in which a segmental pattern is formed in a shape of islands spaced apart.

FIGS. 3A and 3B are a plan view and a perspective view illustrating a modified form of a touch sensor according to the present invention in which a segmental pattern is formed in a shape of islands spaced apart.

BEST MODE

Hereinafter, the present invention will be described in detail with reference to the accompanying drawings.

Korean Patent Registration No. 10-1952770 (Touch Sensor) presented as a prior art document was filed and registered by the same applicant as the present invention, and descriptions of Korean Patent Registration No. 10-1952770 is incorporated herein as a part of the invention to the extent not in conflict with the present invention.

FIGS. 2A and 2B are a plan view and a perspective view of a touch sensor according to the present invention in which a segmental pattern is formed in a shape of islands spaced apart.

As shown in FIGS. 2A and 2B, the touch sensor according to the present invention may include a substrate 200, a sensing electrode, and so on.

The substrate 200 is a base of the sensing electrode, and may be composed of, for example, a cyclo-olefin polymer (COP), polycarbonate, polyethylene terephthalate (PET), polymethyl methacrylate, polyimide, polyethylene naphthalate, polyether sulfone, etc.

The substrate 200 may be a separation layer, a protective layer, or a laminate of a separation layer and a protective layer when the touch sensor is manufactured by a transfer method.

The separation layer may be composed of an organic polymer film, for example, polyimide, poly vinyl alcohol, polyamic acid, polyamide, polyethylene, polystyrene, polynorbornene, etc.

The protective layer may include at least one of an organic insulation layer or an inorganic insulation layer, and it can be formed through coating/curing or deposition.

The sensing electrode may include, for example, a plurality of sensing electrode units 100 that are regularly arranged and connected horizontally and vertically on the substrate 200. Here, the sensing electrode unit 100 is used to have the same meaning as the sensing cell. The sensing electrode unit 100 may have various shapes, such as a triangle, a quadrangle, a pentagon, and a hexagon. FIGS. 2A and 2B illustrate a part of such sensing electrode unit 100.

The sensing electrode unit 100 may be composed of a transparent oxide, a conductive metal, or the like. The transparent oxide may be a conductive oxide such as indium zinc oxide (IZO), aluminum zinc oxide (AZO), aluminum oxide ($Al_2O_3$), etc. Also, indium zinc tin oxide (IZTO), indium oxide (InOx), tin oxide (SnOx), cadmium tin oxide (CTO), gallium-doped zinc oxide (GZO), zinc tin oxide (ZTO), indium gallium oxide (IGO), or the like can be used. The conductive metal may be gold, silver, copper, or the like.

The sensing electrode unit 100 may have a plurality of pattern etched parts PH and a plurality of segmental etched parts SH2.

The pattern etched part PH is to block or minimize the visual distinguishability between the sensing region and the inter-cell region, and a specific arrangement pattern may be formed by removing a portion of the sensing electrode unit 100 while penetrating up and down. The arrangement pattern of the pattern etched part PH may form a micro-etched pattern of the same shape. Here, the region surrounded by the micro-etched pattern may constitute a unit transparent electrode. The unit transparent electrodes may be arranged to form a so-called tessellation structure.

The pattern etched part PH may form a micro-etched pattern in connection with the adjacent pattern etched part PH. The micro-etched pattern may have a polygonal shape, for example, a rectangular shape, a pentagonal shape, a hexagonal shape, a rhombus shape, or the like.

The pattern etched part PH has a curved shape, for example, a sine curve, a cosine curve, a conic section, a catenary, a curve of pursuit, a cycloid, a trochoid, a cardioid, or the like, in a perimeter connecting polygon vertices of the micro-etched pattern.

In the process of forming the square-shaped micro-etched pattern, a virtual micro-square is first assumed in the sensing electrode unit 100, and two adjacent vertices can be virtually connected with a sine wave. This process is repeatedly performed for four vertices, and as a result, an imaginary curve connected with four sine waves based on one imaginary square, that is, a perimeter may be generated.

Thereafter, by etching and removing a portion of the curve in which the four sine waves are connected, one micro-etched pattern can be formed. The micro-etched pattern may have a pitch (total width) of, for example, 100 to 500 µm, and the width of the pattern etched part PH may be 5 to 20 µm.

If this process is performed over the entire sensing electrode unit 100, the sensing electrode unit 100 in which a plurality of micro-etched patterns are arranged in a tessellation structure may be formed. Here, since the micro-etched pattern is partially removed along the perimeter of the unit transparent electrode, the remaining areas of the micro-etched pattern are electrically connected to each other to form an integrated sensing region with the adjacent unit transparent electrode.

Through this configuration, the low frequency component of the spatial frequency induced by the sensing electrode unit 100 is converted into a high frequency component, making it difficult to be recognized by the user's eyes, in the sensing electrode unit 100. Furthermore, the light transmittance of the sensing electrode unit 100 may increase due to the pattern etched part PH, thereby increasing the overall light transmittance of the touch sensor.

The segmental etched part SH2 is formed to divide the sensing electrode unit 100 into the first area A21 and the second area A22 and drive. As shown in FIGS. 2A and 2B, when viewed from one sensing electrode unit 100, the segmental etched part SH2 may be formed by removing the transparent oxide constituting the sensing electrode unit 100 along the boundary between the first area A21 and the second area A22 to separate the sensing electrode unit 100 physically and electrically.

The segmental etched part SH2 may communicate with the pattern etched part PH by penetrating the non-penetrated area of the sensing electrode unit 100 vertically along the periphery of the unit transparent electrode at the boundary between the first area A21 and the second area A22. For example, when the unit transparent electrode is formed of a polygon and the pattern etched part PH is formed to be spaced apart along the perimeter connecting the vertices of the polygon, the segmental etched part SH2 may be located between the vertex of the unit transparent electrode and the pattern etched part PH. In this way, the segmental etched parts SH2 may be formed to be spaced apart from each other in an island shape.

The segmental pattern having the island-arranged segmental etched part SH2 is arranged in the same shape as the micro-etched pattern to form the same spatial frequency. As a result, it is possible to block or minimize the recognition of the segmental pattern P2 as being distinguished from the sensing region, the inter-cell region, and the like. Furthermore, the light transmittance of the sensing electrode unit 100 may increase due to the segmental etched part SH2, and thus the total light transmittance of the touch sensor may be increased.

The segmental etched part SH2 may have a different shape depending on its location, for example, a vertex area, a perimeter between the vertices, and the like.

It is preferable that the segmental etched part SH2 has the same width as that of the pattern etched part PH. However, when the touch sensor is configured with a large area, divided stitch exposure is usually performed using a divided exposure mask. At this time, the width of the segmental etched part SH2 may be formed to be larger than the width of the pattern etched part PH in the exposure mask in consideration of tolerances due to sequential exposure. In this case, in the completed touch sensor, the width of the segmental etched part SH2 may be formed wider than the width of the pattern etched part PH.

The segmental pattern P2 described above may be simultaneously formed in the process of forming the pattern etched part PH.

In FIGS. 2A and 2B, an insulation layer or a passivation layer may be formed on the upper surface of the sensing electrode unit 100, the pattern etched part PH, and the segmental etched part SH2.

The insulation layer or the passivation layer is to insulate and protect the sensing electrode unit 100. The insulation layer or the passivation layer may be composed of one or more materials selected from a curable prepolymer, a curable polymer, and a plastic polymer, which are general insulators.

The insulation layer or the passivation layer may be made of a varnish-type material capable of forming a film. The varnish-type material may be polysilicone, such as polydimethylsiloxane (PDMS) or polyorganosiloxane (POS), polyimide, or polyurethane, such as spandex. The varnish-type material is a soft insulation material and can increase the stretchability and dynamic folding capability of the touch panel.

As shown in FIGS. 2A and 2B, an area that does not function as a sensing region due to the formation of the pattern etched part PH and the segmental etched part SH2, i.e., a dummy area D1, may be formed between the first area A21 and the second area A22.

FIGS. 3A and 3B are a plan view and a perspective view illustrating a modified form of a touch sensor in which a segmental pattern is formed in a shape of islands spaced apart.

As shown in FIGS. 3A and 3B, the segmental pattern P3 may be formed to be wide, i.e. to have two or more lines (arrangements). In this case, the dummy area D2 formed by the pattern etched part PH and the segmental etched part SH3 between the first area A31 and the second area A32 may be formed to have a wider width.

Meanwhile, in the above description, the case in which the substrate is separated left and right by forming the segmental patterns P2 and P3 along the boundary of the unit transparent electrode has been exemplified. It can also be used in the form of separating the substrate up and down.

The above-described touch sensor may include a bridge electrode unit connecting two adjacent sensing electrode units with the sensing electrode unit interposed therebetween.

The above-described touch sensor may form an inter-electrode dummy between the sensing electrode units. The inter-electrode dummy may have the same shape as the unit transparent electrode, but may be configured to be electrically insulated from the unit transparent electrode. In the inter-electrode dummy, a dummy pattern having the same spatial frequency as the unit transparent electrode may be inserted to dispose the same high-frequency component on the entire surface of the touch sensor. Through this, it is possible to prevent the touch sensor pattern from being visually recognized by the same high-frequency component disposed on the entire surface of the touch sensor.

In the touch sensor of the present invention, the sensing electrode unit may be disposed vertically. In this case, an insulation layer may be formed between the upper and lower sensing electrodes.

In the touch sensor of the present invention, a width of a connection part connecting adjacent unit transparent electrodes may be in a range of 20 μM to 60 μM With this configuration, it is possible to prevent an increase in resistance that may occur in the process of connecting the adjacent unit transparent electrodes, and at the same time, it is possible to prevent a decrease in visibility due to the connection part.

Although particular embodiments of the present invention have been shown and described, it will be understood by those skilled in the art that it is not intended to limit the present invention to the preferred embodiments, and it will be obvious to those skilled in the art that various changes and modifications may be made without departing from the spirit and scope of the invention.

The scope of the present invention, therefore, is to be defined by the appended claims and equivalents thereof.

| [Description of reference numerals] | |
| --- | --- |
| 10, 100, 300: sensing electrode unit | 20, 200, 400: substrate |
| PH: pattern etched part | P1: conventional segmental pattern |
| P2, P3: segmental pattern of the present invention | |
| SH1: conventional segmental etched part | |
| SH2, SH3: segmental etched part of the present invention | |

The invention claimed is:

1. A touch sensor, comprising:
   a first sensing electrode unit formed on a substrate in a first direction;
   a second sensing electrode unit formed on the substrate in a second direction crossing the first direction, wherein a plurality of micro-etched patterns are formed on a boundary of unit transparent electrodes constituting the first sensing electrode unit and the second sensing electrode unit, the unit transparent electrode has a shape in which a portion of a curve connecting vertices of a polygon is removed, and adjacent unit transparent electrodes are electrically connected to each other; and
   a segmental pattern dividing the first or second sensing electrode unit into two or more areas,
   wherein the segmental pattern is formed continuously adjacent to the plurality of micro-etched patterns in an island shape along the boundary of the unit transparent electrode between the two or more areas and wherein the boundary of the unit transparent electrode in the segment pattern is completely devoid of conductive material via micro-etching.

2. The touch sensor of claim 1, wherein the segmental pattern is formed to have a width equal to or greater than a width of the plurality of micro-etched patterns.

3. The touch sensor of claim 1, wherein the segmental pattern separates the first or second sensing electrode unit vertically.

4. The touch sensor of claim 1, wherein the segmental pattern separates the first or second sensing electrode unit left and right.

5. The touch sensor of claim 1, wherein the segmental pattern is formed in the same process as forming the plurality of micro-etched patterns.

6. The touch sensor of claim 1, wherein the segmental pattern is formed of one or more lines.

7. The touch sensor of claim 1, wherein the segmental pattern has the same spatial frequency as the plurality of micro-etched patterns.

8. The touch sensor of claim 1, further comprising:
   a bridge electrode unit connecting two second sensing electrode units adjacent to each other with the first sensing electrode unit interposed therebetween; and
   an inter-electrode dummy formed between the first sensing electrode unit and the second sensing electrode unit, the inter-electrode dummy having the same shape as the unit transparent electrode and being insulated from the unit transparent electrode, wherein a plurality of the unit transparent electrodes divided by the micro-etched pattern has a tessellation structure.

9. The touch sensor of claim 1, further comprising an insulation layer formed on the substrate on which the first sensing electrode unit is formed, wherein the second sensing electrode unit is formed on the insulation layer.

10. The touch sensor of claim 1, wherein the curve includes one or more selected from the group consisting of: a sine curve, a cosine curve, a conic section, a catenary, a curve of pursuit, a cycloid, a trochoid, and a cardioid.

11. The touch sensor of claim 1, wherein the curve is a curve continuously connecting the vertices of the polygon, or a curve partially formed by discontinuously connecting the vertices of the polygon.

12. The touch sensor of claim 1, wherein the boundary of the unit transparent electrodes has a shape in which a portion of the curve connecting two adjacent vertices among the six vertices of the hexagon is removed.

13. The touch sensor of claim 1, wherein the boundary of the unit transparent electrodes has a shape in which a portion of the curve connecting two adjacent vertices among the four vertices of a rectangle arranged in a grid structure is removed.

14. The touch sensor of claim 1, wherein the boundary of the unit transparent electrodes has a shape in which a portion of the curve connecting two adjacent vertices among the four vertices of a rectangle arranged in a zigzag structure is removed.

15. The touch sensor of claim 1, wherein the boundary of the unit transparent electrodes has a shape in which a portion of the curve connecting two adjacent vertices among the four vertices of a rhombus is removed.

16. The touch sensor of claim 1, wherein a pitch of the unit transparent electrode is 100 μm to 500 μm.

17. The touch sensor of claim 1, wherein a width of the micro-etched pattern is 5 μm to 20 μm.

18. The touch sensor of claim 1, wherein a width of a connection part connecting the adjacent unit transparent electrodes is 20 μm to 60 μm.

19. The touch sensor of claim 1, wherein a touch sensor pattern is not recognized due to the same high-frequency components disposed on an entire surface of the touch sensor by inserting a plurality of dummy patterns having the same spatial frequency as the plurality of micro-etched pattern between the first sensing electrode unit and the second sensing electrode unit to dispose the same high-frequency components on the entire surface of the touch sensor.

* * * * *